United States Patent
Adams et al.

(10) Patent No.: US 10,938,933 B2
(45) Date of Patent: Mar. 2, 2021

(54) MANAGING DYNAMIC CONFIGURATION-BASED DATABASE CONNECTIONS USING A PROXY DATASOURCE (71) Applicant: INTERNATIONAL BUSINESS MACHINES CORPORATION, Armonk, NY (US)

(72) Inventors: Phillip Carl Adams, Cedar Park, TX (US); John Thomas Edward Timm, San Jose, CA (US); Nathan Jon Rauh, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/411,873

(22) Filed: May 14, 2019

(65) Prior Publication Data
US 2020/0366751 A1 Nov. 19, 2020

(51) Int. Cl.
*H04L 29/08* (2006.01)
*G06F 12/0808* (2016.01)
*G06F 9/54* (2006.01)

(52) U.S. Cl.
CPC .......... *H04L 67/2804* (2013.01); *G06F 9/545* (2013.01); *G06F 12/0808* (2013.01); *H04L 67/1021* (2013.01); *H04L 67/1097* (2013.01); *H04L 67/28* (2013.01); *H04L 67/327* (2013.01); *H04L 67/34* (2013.01)

(58) Field of Classification Search
CPC .. H04L 67/1021; H04L 67/1097; H04L 67/28
See application file for complete search history.

(56) References Cited

U.S. PATENT DOCUMENTS 7,134,008 B2   11/2006   Dutt et al.
7,325,003 B2    1/2008   Blackwell et al.
(Continued)

OTHER PUBLICATIONS

List of IBM Patents or Patent Applications Treated as Related, dated Jul. 19, 2019, 1 page.
(Continued)

*Primary Examiner* — Lashonda T Jacobs
(74) *Attorney, Agent, or Firm* — Scott Dobson; Andrew D. Wright; Roberts Calderon Safran & Cole, P.C.

(57) ABSTRACT

Systems for managing dynamic configuration-based database connections using a proxy datasource are disclosed. In embodiments, a computer program product is provided including a computer readable storage medium having program instructions embodied therewith. The program instructions are executable by a computing device to cause the computing device to: send, by a software application of the computing device, a request for a connection to a first database to a proxy datasource of the computing device, wherein the request includes a database identifier and configuration data; pass, by a first concrete datasource of the computing device, a connection to the first database to the proxy datasource; return, by the proxy datasource of the computing device, the connection to the software application; and access, by the software application of the computing device, the first database via the connection.

20 Claims, 7 Drawing Sheets

(56) References Cited

U.S. PATENT DOCUMENTS

| | | | |
|---|---|---|---|
| 7,558,799 B2* | 7/2009 | Battagin | G06F 16/25 |
| 8,145,759 B2* | 3/2012 | Bhogi | G06F 9/5061 |
| | | | 709/226 |
| 8,234,240 B2 | 7/2012 | Myerson et al. | |
| 8,429,609 B2* | 4/2013 | Bhasker | G06Q 10/06 |
| | | | 717/122 |
| 9,032,425 B1* | 5/2015 | Madanapalli | G06F 9/541 |
| | | | 719/328 |
| 9,419,853 B1* | 8/2016 | Yaeger | G06F 9/543 |
| 9,742,850 B1 | 8/2017 | Yaeger | |
| 9,930,129 B2* | 3/2018 | Felts | H04L 67/28 |
| 9,967,324 B2 | 5/2018 | Somogyi et al. | |
| 10,033,823 B1* | 7/2018 | Naugariya | H04W 12/0808 |
| 10,503,623 B2* | 12/2019 | Keller | G06F 9/542 |
| 2005/0060722 A1* | 3/2005 | Rochette | G06F 8/60 |
| | | | 719/319 |
| 2005/0066155 A1* | 3/2005 | Dutt | H04L 67/125 |
| | | | 713/1 |
| 2006/0234730 A1* | 10/2006 | Bibr | H04L 67/04 |
| | | | 455/466 |
| 2008/0127055 A1* | 5/2008 | Davis | G06F 8/20 |
| | | | 717/106 |
| 2012/0066363 A1 | 3/2012 | Somogyi et al. | |
| 2014/0075073 A1 | 3/2014 | Wong | |
| 2014/0129592 A1 | 5/2014 | Samudrala et al. | |
| 2016/0088108 A1* | 3/2016 | Felts | H04L 67/28 |
| | | | 709/223 |
| 2016/0094486 A1* | 3/2016 | Sahoo | G06F 8/60 |
| | | | 709/226 |
| 2016/0219019 A1* | 7/2016 | Mathur | H04L 67/16 |
| 2017/0195449 A1 | 7/2017 | Mobbs et al. | |
| 2018/0121519 A1 | 5/2018 | Cook et al. | |

OTHER PUBLICATIONS

Specification "Managing Dynamic Configuration-Based Database Connections Using a Proxy Datasource" and drawings in related U.S. Appl. No. 16/509,770, filed Jul. 12, 2019, 37 pages.

Begoli et al., "Apache Calcite: A Foundation Framework for Optimized Query Processing Over Heterogeneous Data Sources", SIGMOD'18 ACM SIGMOD International Conference, pp. 221-230, Jun 10-15, 2018, 10 pages.

Rekatsinas et al., "Characterizing and Selecting Fresh Data Sources", SIGMOD'14 ACM SIGMOD International Conference, pp. 919-930, Jun. 22-27, 2014, 12 pages.

Anonymous, "Data Sources and Tableau Server: Creating, Maintaining and Publishing Data Sources on Tableau Server", www.tableau.com, pp. 1-53, Nov. 14, 2017, 53 pages.

Harth et al., "On-The-Fly Integration of Static and Dynamic Linked Data", COLD'13 ACM COLD International Conference, vol. 1034, pp. 1-12, Oct. 12, 2013, 12 pages.

Anonymous, "Oracle® Fusion Middleware Administering JDBC Data Sources for Oracle WebLogic Server", https://docs.oracle.com/middleware/1221/wls/JDBCA/proxy_datasources.htm#JDBCA743, Oracle Help Desk, accessed Apr. 10, 2019, 2 pages.

Office Action dated Jun. 1, 2020 in related U.S. Appl. No. 16/509,770, 7 pages.

Notice of Allowance dated Oct. 28, 2020 in related U.S. Appl. No. 16/509,770, 10 pages.

\* cited by examiner

MANAGING DYNAMIC CONFIGURATION-BASED DATABASE CONNECTIONS USING A PROXY DATASOURCE

BACKGROUND

The present invention relates generally to managing datasources and, more particularly, to managing dynamic configuration-based database connections using a proxy datasource.

A datasource is a collection of information about a database such as the type of database, the location of the database, or credentials that might be associated with the database. A datasource is utilized to configure and access database connections between a server (or an application on the server) and a database. An application container is a controlling element for an application instance that runs within an application container environment. Within an application server/application container environment, datasources are typically configured statically via a deployment descriptor. Such datasources usually include connection information (e.g., database server hostname, port number, database name, etc.), as well as additional properties to control the behavior of database connections served up by the datasource (e.g. read timeout, write timeout, automatic client re-route properties, etc.).

SUMMARY

In an aspect of the invention, there is a computer program product including a computer readable storage medium having program instructions embodied therewith. The program instructions are executable by a computing device to cause the computing device to: send, by a software application of the computing device, a request for a connection to a first database to a proxy datasource of the computing device, wherein the request includes a database identifier and configuration data; pass, by a first datasource of the computing device, a connection to the first database to the proxy datasource; return, by the proxy datasource of the computing device, the connection to the software application; and access, by the software application of the computing device, the database via the connection.

In another aspect of the invention, there is a system including a processor, a computer readable memory and a computer readable storage medium associated with a computing device. The system further includes: program instructions to send, by a software application of the computing device, a request to a proxy datasource of the computing device for a connection to a first database, wherein the request includes a database identifier and configuration data; program instructions to instantiate, by the proxy datasource of the computing device, a first concrete datasource for the first database according to the configuration data; program instructions to pass, by the proxy datasource of the computing device, a connection to the first database to the proxy datasource; program instructions to return, by the proxy datasource of the computing device, the connection to the software application; and program instructions to access, by the software application of the computing device, the database via the connection, wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to managing datasources and, more particularly, to managing dynamic configuration-based database connections using a proxy datasource. In embodiments, a proxy datasource implementation is utilized to allow new database connections to be configured for use by an application without the need to restart the application. In implementations, the proxy datasource is defined to the application server/application container environment through the use of a single static datasource definition. This proxy datasource implementation then uses a configuration-based approach for managing any number of concrete datasources. In aspects, an application obtains database connections by using the proxy datasource in much the same way that it would use a static datasource, but also specifies a datasource identifier that acts as a key into the configuration of database connections (e.g., first and second databases).

Since datasources are typically configured statically, the configuration of any new database connections that might be needed by the application would require a restart of the application. This restart requirement can be problematic in situations in which a server-based application needs to be "always on".

Advantageously, embodiments of the invention provide improvements to a computing device and to the technical field of implementing configuration-based database connections. More specifically, embodiments of the invention provide dynamic configuration-based management of concrete datasources and the proxy's dynamic management of database connections to these non-static datasources, which prevents the need to configure static datasources with the application container environment. Additionally, embodiments of the invention enable eXtended Architecture (XA) transaction recovery functionality, which allows the entire collection of concrete datasources to appear as a single XA datasource to the application container when it triggers XA transaction recovery operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
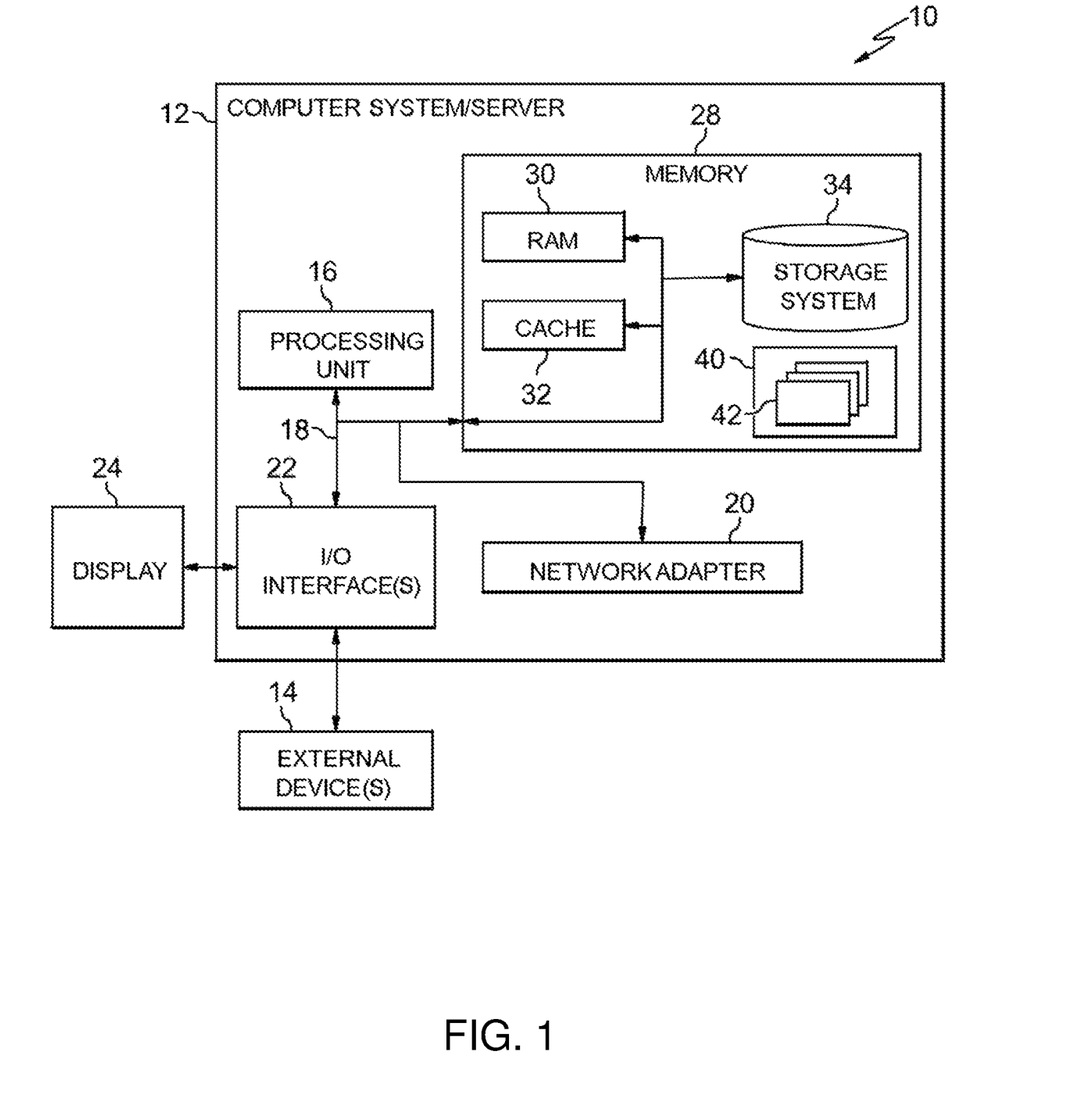
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
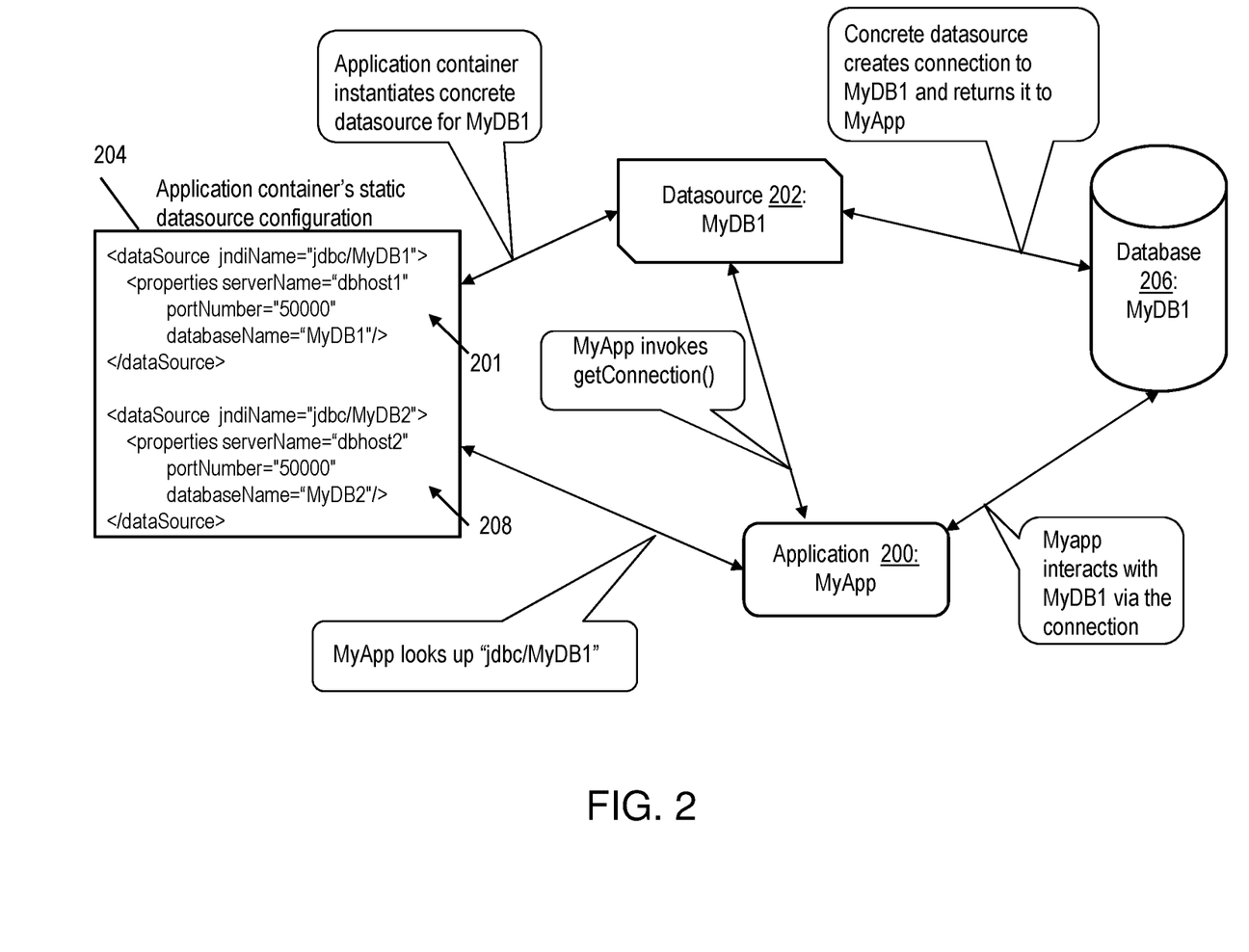
FIG. 2 is an exemplary diagram of a static datasource configuration for managing connections between a software application and a database.

FIG. 2 is an exemplary diagram of a static datasource configuration for managing connections between a software application and a database. The configuration of FIG. 2 may be implemented by the computer system 12 (e.g., server) of FIG. 1. FIG. 2 represents a scenario wherein an application (MyApp) 200 wishes to connect to one or more databases.

As illustrated in FIG. 2, when an application (MyApp) 200 desires a connection to a database 206 (MyDB1), the application 200 initially requests a handle (a reference based on the configuration data 201) to a datasource 202 from an application container represented at 204. The datasource 202 is a concrete datasource; meaning that it is a real instance of a datasource comprising a collection of information about a database, which may be utilized to configure and access database connections between a server (or an application on the server) and the database. The term application container as used herein refers to a controlling element for an application instance that runs within an application container environment. The application container 204 instantiates (creates), as needed, the datasource 202 for the database 206. In the example of FIG. 2, the datasource 202 includes connection information (e.g., database server hostname, port number, database name, etc.), as well as additional properties to control the behavior of the database connections served up by the datasource 202 (e.g., read timeout, write timeout, automatic client re-route properties, etc.).

In the example of FIG. 2, the application container 204 provides the handle for the database 206 to the application 200, and the application 200 utilizes the handle to send a request to the datasource 202 for a connection to the database 206. The datasource 202 passes a connection to the database 206, and returns it to the application 200. The application 200 then interacts with the database 206 (e.g., accesses information in the database 206) via the connection created by the datasource 202 and returned to the application 200 by the datasource 202.

Since the datasource 202 is configured statically, the configuration of any new database connections that might be needed by the application 200 would require a restart of the application 200. This restart requirement can be problematic in situations in which the application 200 needs to be "always on" or in which it is undesirable to restart the application 200. For example, if a user of the application 200 needed to introduce a new datasource to connect to an additional database MyDB2 (not depicted), then the static configuration would be updated to include the configuration data 208 for MyDB2. After the application container's static datasource configuration is updated to include the configuration data 208, the application 200 would need to be restarted in order to allow the application 200 to connect to the new database MyDB2.

Figure 3:
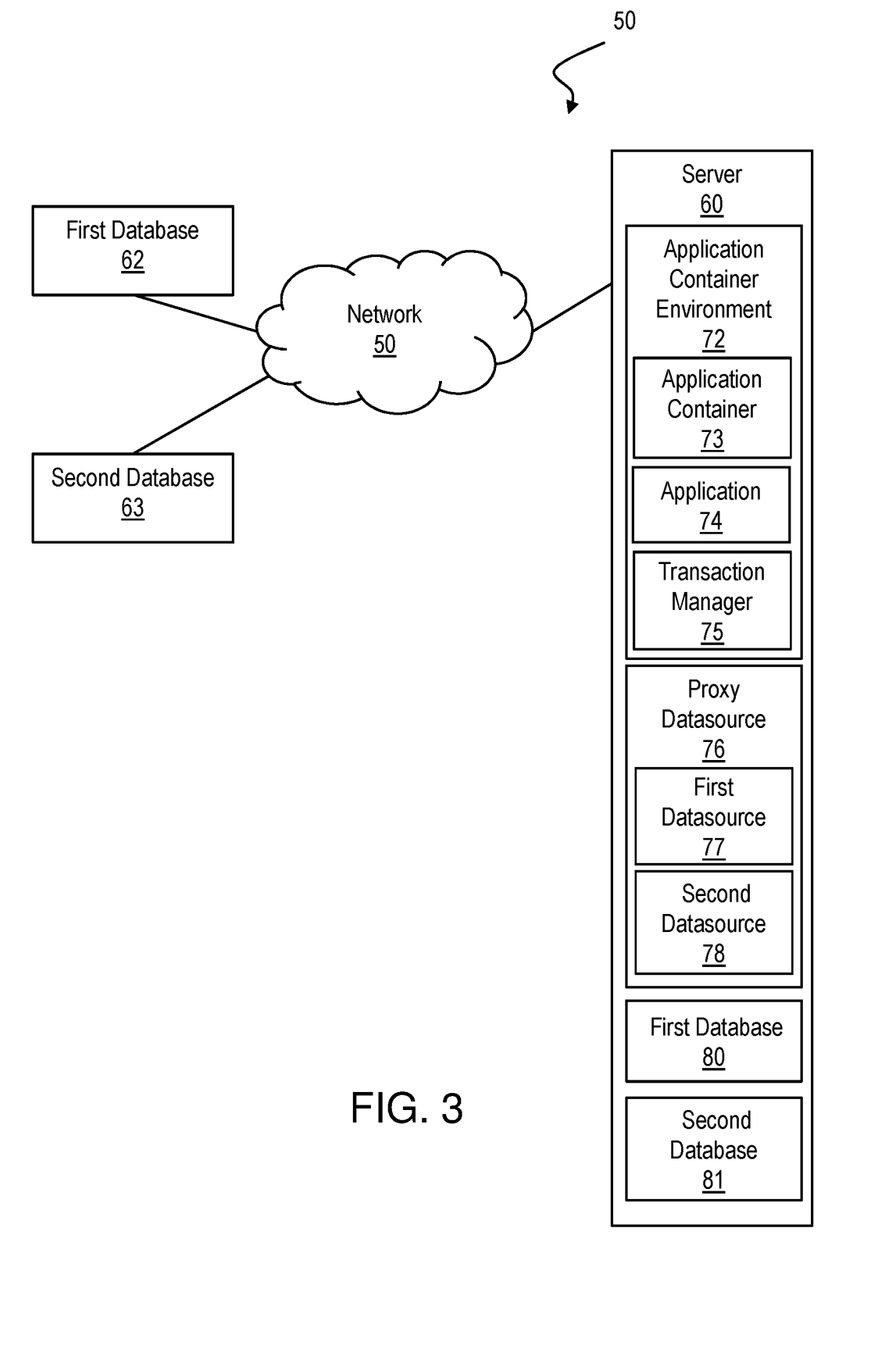
FIG. 3 shows an exemplary environment in accordance with aspects of the invention.

FIG. 3 shows an exemplary environment in accordance with aspects of the invention. The environment includes network 50 connecting a server 60 to one or more databases represented at 62 and 63. The server 60 may comprise the computer system 12 of FIG. 1, and may be connected to the network 50 via the network adapter 20 of FIG. 1.

The network 20 may be any suitable communication network or combination of networks, such as a local area network (LAN), a general wide area network (WAN), and/or a public network (e.g., the Internet). The first and second databases 62 and 63 may be any type of data source configured to provide information to the server 60 or store information from the server 60.

Still referring to FIG. 3, the server 60 may include one or more program modules (e.g., program module 42 of FIG. 1) configured to perform one or more functions described herein. In embodiments, the server 60 includes an application container environment 72 including one or more software applications represented by application 74. The term application container environment refers to a computing environment utilizing application containers (e.g., application container 73) to run desired software applications (e.g., application 74). The term application container as used herein refers to a controlling element for an application instance that runs within an application container environment. Application containers include runtime components, such as files, environment variables and libraries necessary to run the desired software. In implementations, the application container environment 72 further includes a transaction manager 75 configured to manage eXtended Architecture (XA) recovery functions.

In implementations, the server 60 further comprises a proxy datasource module 76 (hereafter proxy datasource 76), configured to create concrete datasources (e.g., first and second datasources 77 and 78), and act as an intermediary between a software application (e.g., application 74) and the concrete datasources to facilitate the establishment of a connection between the software application and a database (e.g., first database 80 or second database 81). The term proxy datasource as used herein refers to computer software that acts as a proxy to concrete (real) datasources so that the concrete datasources can be managed dynamically as configuration changes are made, without impacting the software application relying on the concrete datasource for a database connection. For example, in the case where a new database is added to the application container environment 72, the configuration information for an existing database (e.g., first database 80) may be changed or removed from stored configuration data. The first and second datasources 77 and 78 are concrete datasources utilized to configure and access database connections between a server or an application on the server (e.g., application 74) and a local or remote database (e.g., local first and second databases 80 and 81 or remote first and second database 62 and 63).

In embodiments, the sever 60 may include additional or fewer components than those shown in FIG. 3. In embodiments, separate components may be integrated into a single computing component or module. Additionally, or alternatively, a single component may be implemented as multiple computing components or modules.

Figure 4:
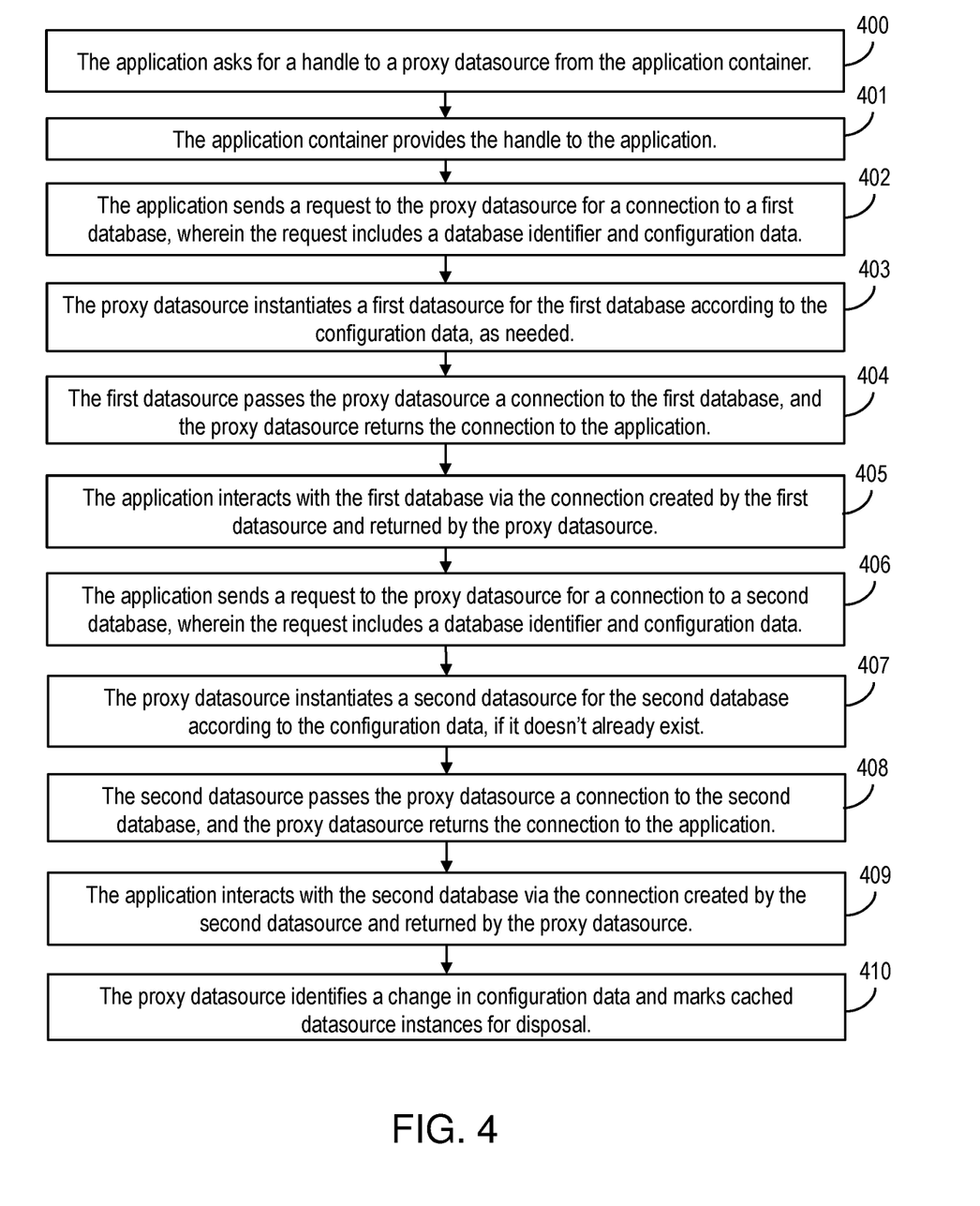
FIG. 4 shows a flowchart of steps of an exemplary method for dynamic configuration-based database connections with software applications utilizing a proxy datasource in accordance with embodiments of the invention.

FIG. 4 shows a flowchart of an exemplary method in accordance with aspects of the invention. More specifically, FIG. 4 illustrates a method for dynamic configuration-based database connections with software applications utilizing a proxy datasource. Steps of the method of FIG. 4 may be performed in the environment illustrated in FIG. 3, and are described with reference to elements shown in FIG. 3.

At step 400, the application 74 sends a request to the application container 73 for a handle to the proxy datasource 76. The request is sent based on the desire to connect the application 74 to a first database (e.g., the first database 62 or the first database 80). For the purpose of FIG. 4, the first database 80 is referenced hereafter. In contrast to the dynamically configurable method of FIG. 4 which requests a handle to a proxy datasource 76, the static datasource configuration of FIG. 2 requests a handle to a concrete datasource (e.g., datasource 202 of FIG. 2).

At step 401, the application container 73 provides the application 74 with the handle to the proxy datasource 76 in response to the request of step 400. In contrast to the method of FIG. 4, in static datasource configurations such as the one represented in FIG. 2, a handle is returned to a concrete datasource (e.g., datasource 202 of FIG. 2) rather than a proxy datasource (e.g., proxy datasource 76 of FIG. 4).

At step 402, the application 74 sends a request to the proxy datasource 76 for a connection to the first database 80 (i.e., a request for a datasource) based on the handle received at step 401. In implementations, the request includes a datasource or database identifier (e.g., "db1") identifying the first database 80, and configuration data. In aspects, the datasource or database identifier is specified through a specialized use of existing method parameters (e.g., DataSource.getConnection(String, String)), through a thread-local structure, or other method. The manner in which an application specifies the datasource or database identifier to the proxy datasource 76 when obtaining a connection to the first database 80 may vary depending on a particular implementation. In contrast to the method of FIG. 4, in static datasource configurations such as the one represented in FIG. 2, a request for a connection to a database is sent directly to a concrete datasource (e.g., datasource 202 of FIG. 2).

At step 403, the proxy datasource 76 instantiates a first datasource 77 (concrete datasource) for the first database 80 as needed (i.e., if the first datasource 77 has not yet been created/cached) in response to the request of step 402. In implementations, the first datasource 77 is created based on the configuration data of the request of step 402.

At step 404, the proxy datasource 76 causes the first datasource 77 to pass the proxy datasource 76 a connection to the first database 80, and the proxy datasource 76 then returns the connection to the application 74. Step 404 may be implemented after creation of the first datasource 77 at step 403, or when the first datasource 77 is already created, in response to the request for connection of step 402. In contrast to the method of FIG. 4, in static datasource configurations such as the one represented in FIG. 2, a concrete datasource (e.g., datasource 202 of FIG. 2) itself returns a database connection to the application (e.g., application 200 of FIG. 2).

At step 405, the application 74 interacts with the first database 80 via the connection created by the first datasource 77 and returned to the application 74 by the proxy datasource 76. The application 74 may interact with the first database 80 to access or obtain data from the database 80, or to store data in the first database 80.

In embodiments, the application 74 connects to a plurality of databases utilizing the proxy datasource 76. In this way, new database configurations may be implemented within the application container environment 72 without the need for restarting the application 74 or server 60 to instantiate a new datasource for the new database.

In one example at step 406, the application 74 sends a request to the proxy datasource 76 for a connection to the second database 81 (i.e., a request for a datasource) based on the handle received at step 401. In implementations, the request includes a datasource or database identifier (e.g., "db2") identifying the second database 81, and configuration data.

At step 407, the proxy datasource 76 instantiates (creates) the second datasource 78 for the second database 81 as needed (i.e., if the second datasource 78 has not yet been created/cached) in response to the request of step 406. In implementations, the second datasource 78 is created based on the configuration data of the request of step 406.

At step 408, the proxy datasource 76 causes the second datasource 78 to pass the proxy datasource 76 a connection to the second database 81, and the proxy datasource 76 returns the connection to the application 74. In contrast to the method of FIG. 4, in static datasource configurations such as the one represented in FIG. 2, a concrete datasource creates a connection to a database and directly returns the connection to an application.

At step 409, the application 74 interacts with the second database 81 via the connection created by the second datasource 78 and returned to the application 74 by the proxy datasource 76. The application 74 may interact with the second database 81 to obtain or access data in the second database 81, or to store data in the second database 81, for example.

In embodiments, once the proxy datasource 76 mechanisms described above is in place, the proxy datasource's configuration is updated dynamically to configure a new concrete datasource. The application 74 then immediately starts to request connections from this new datasource without the need to restart the application 74 or the application server/container environment, since it is the proxy datasource 76 which deals with the underlying datasource configuration and manages the concrete datasource instances, as opposed to the application server/application container 73. Implementations of the proxy datasource 76 enable the server 60 to reload configuration properties as needed on the fly in order to recognize and use any new configuration data. In implementations, a robust implementation of this dynamic configuration feature includes the ability of the proxy datasource 76 to detect changes to existing configuration information and react to those changes by marking any cached concrete datasource instances (affected by the configuration changes) for disposal so that any subsequent connection requests associated with any changed datasource configurations would result in instantiating a new instance of the concrete datasource using the new configuration information.

Accordingly in implementations, at step 410, when the configuration data of the connection request (request of steps 402 or 406) comprises new configuration data, the proxy datasource 76 identifies the change in configuration data and marks cached datasource instances for disposal. Thereafter the proxy datasource 76 instantiates a new datasource based on the new configuration data.

Figure 5:
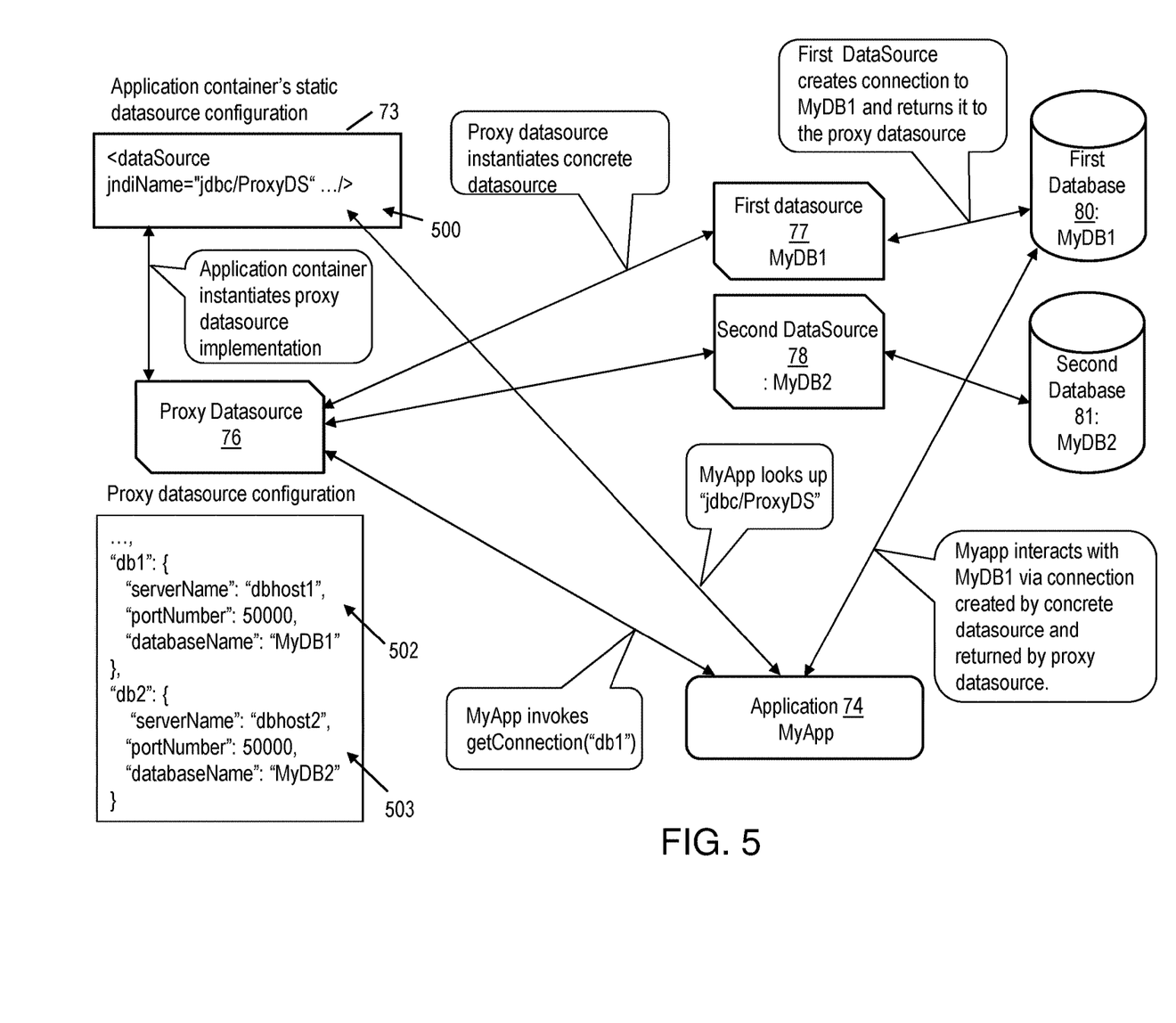
FIG. 5 is an exemplary block diagram illustrating the method of FIG. 4 in accordance with aspects of the invention.

FIG. 5 is an exemplary block diagram illustrating the method of FIG. 4. The configuration of FIG. 5 may be implemented by the computer system 12 (e.g., server) of FIG. 1. FIG. 5 represents a scenario wherein an application (MyApp) 74 wishes to connect to one or more databases.

With reference to FIG. 5, an application (MyApp) 74 initially requests a handle (a reference based on the configuration data 500) to a proxy datasource 76 from an application container represented at 73, in accordance with step 400 of FIG. 4. In the example of FIG. 5, configuration data 500 includes "<dataSource jndiName="jdbc/ProxyDS" . . . />". The application container 73 provides the handle (e.g., "jdbc/ProxyDS") to the application 74 in accordance with step 401 of FIG. 4, and the application 74 sends a request to the proxy datasource 76 for a connection to a first database 80 (MyDB1) including a database identifier (e.g., "db1") and configuration data in accordance with step 402 of FIG. 4. In the example shown, the application 74 invokes getConnection ("db1").

In the scenario of FIG. 5, a concrete datasource for the first database 80 has not yet been created. The proxy datasource 76 creates the first datasource 77 for the first database 80 (MyDB1) based on the configuration data in the request, in accordance with step 403 of FIG. 4. In one example, configuration data 502 for the first database 80 includes the following: . . . , "db1":{"serverName":"dbhost1", "portNumber":50000, "databaseName":"MyDB1"}. The first datasource 77 passes, to the proxy datasource 76, a connection to the first database 80 and the proxy datasource 76 returns the connection to the application 74, in accordance with step 404 of FIG. 4. The application 74 then interacts with the first database 80 to access data from the first database 80 and/or store data in the first database 80, in accordance with step 405 of FIG. 4.

In the exemplary scenario of FIG. 4, the application 74 wishes to connect to a second database 81 for which a concrete datasource has not yet been created. Accordingly, the application 74 sends a request to the proxy datasource 76 for a connection to the second database 81 (MyDB2) including a database identifier (e.g., "db2") and configuration data in accordance with step 406 of FIG. 4. In one example, the application 74 invokes getConnection("db2"). The proxy datasource 76 generates the second datasource 78 for the second database 81 (MyDB2) based on the configuration data in the request, in accordance with step 407 of FIG. 4. In one example, configuration data 503 for the second database 81 includes the following: db2":{"serverName": "dbhost2", "portNumber":50000, "databaseName": "MyDB2"}. The second datasource 78 passes, to the proxy datasource 76, a connection to the second database 81 and the proxy datasource 76 returns the connection to the application 74, in accordance with step 408 of FIG. 4. The application 74 then interacts with the second database 81 to obtain data from the second database 81 and/or store data in the second database 81, in accordance with step 409 of FIG. 4.

Based on the above, implementations of the invention utilize the proxy datasource 76 as a proxy to concrete (real) datasources (e.g., first and second datasources 77 and 78) so that the concrete datasources can be managed dynamically as configuration changes are made, without impacting the application (e.g., application 74) wishing to utilize the datasource. A configuration change may occur, for example when a new database is added, and the configuration information for an existing database is changed or removed from the configuration. In implementations, part of the management of these concrete datasources involves an eXtended Architecture (XA) transaction management façade that is provided by the proxy datasource 76 implementation. The term XA refers to a two-phase commit protocol that is natively supported by many database and transaction monitors. In aspects, the XA transaction management façade appears as a single XA resource to the application container 73 which handles XA recovery steps triggered by a transaction manager 75. In implementations, the present invention provides a mechanism for XA recovery, wherein, during a recovery phase, the proxy datasource 76 provides the transaction manager 75 with a single logical XA resource that supplies recoverable Xids (identifiers that identify each transaction branch in XA transactions) for a multiplicity of XA resources, enabling the transaction manager 75 to agnostically recover transactional operations across multiple distinct datasources. An Xid is comprised of a global transaction identification (ID) that identifies a global transaction that a transaction will be a part of, a global transaction format ID, and a branch qualifier ID that uniquely identifies the transaction branch.

In situations where static datasources are utilized, such as the one depicted in FIG. 2, XA recovery transactions are handled by the application container (e.g., application container 204 of FIG. 2). However, in embodiments of the present invention utilizing proxy datasources, the application container (e.g., 73) is unaware of concrete datasources in use. Accordingly, XA recovery transactions utilize the proxy datasource to implement recovery transactions, based on the proxy datasources knowledge of existing concrete datasources.

In XA implementations, the transaction manager 75 commits distributed branches of a global transaction using a two-phase commit protocol. In phase one, the transaction manager 75 directs each resource manager (not shown) to prepare to commit, which is to verify and guarantee it can commit its respective branch of the global transaction. If a resource manager cannot commit its branch, the transaction manager 75 rolls back the entire transaction in phase two. In phase two, the transaction manager 75 either directs each resource manager to commit its branch or, if a resource manager reported it was unable to commit in phase one, rolls back the global transaction. In implementations, when a database is loaded from disk to recover after a failure or unexpected termination, any global transactions that were prepared but not committed are left pending, or in doubt. For recovery, the transaction manager 75 calls recover method of each XA resource.

Figure 6A:
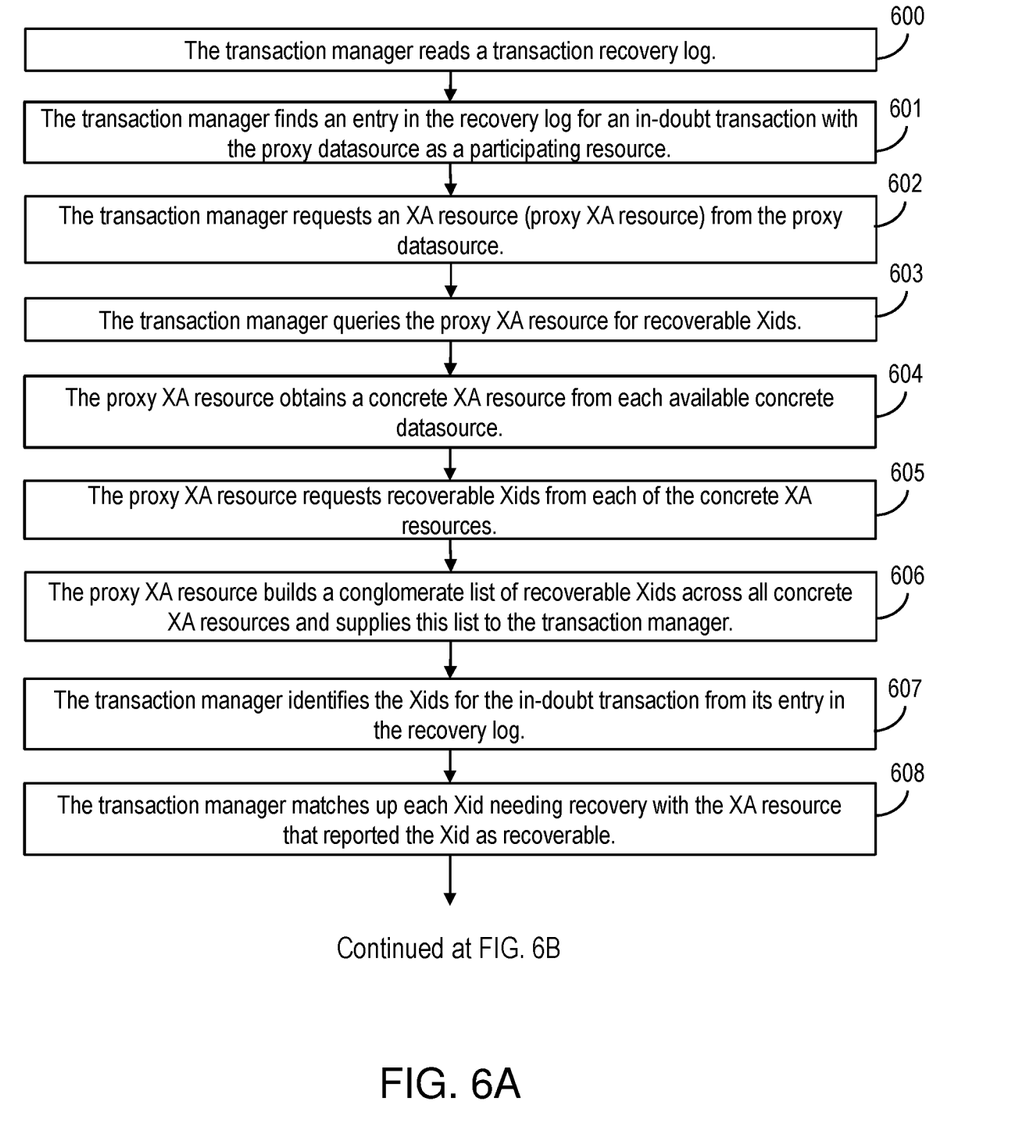
FIGS. 6A and 6B show a flowchart of steps of an exemplary recovery method in accordance with aspects of the invention.
Figure 6B:
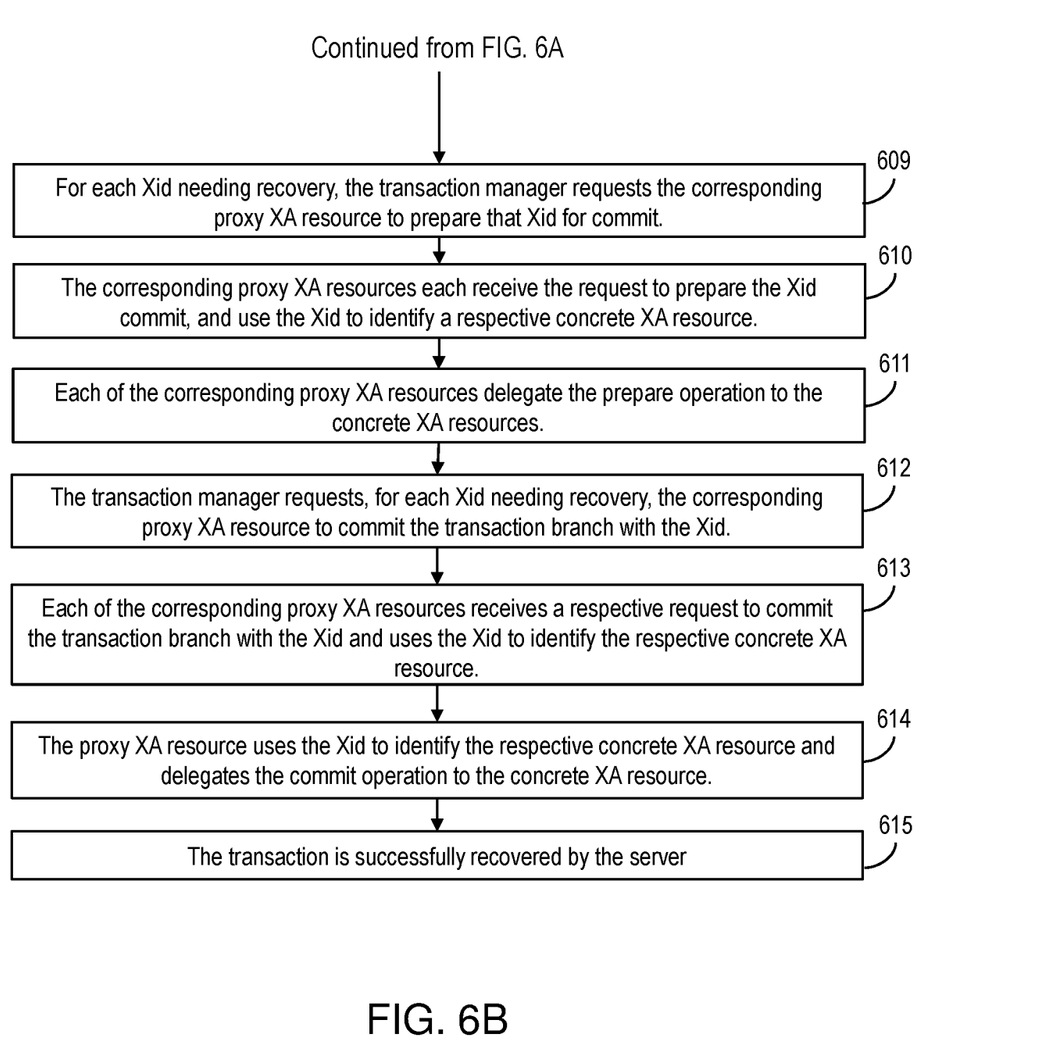

FIGS. 6A and 6B show a flowchart of an exemplary method in accordance with aspects of the invention. More specifically, FIGS. 6A and 6B illustrate an exemplary method for XA recovery utilizing a proxy datasource of the invention. Steps of the method of FIGS. 6A and 6B may be performed in the environment illustrated in FIG. 3, and are described with reference to elements shown in FIG. 3.

At step 600, the transaction manager 75 reads a transaction recovery log stored by the server 60. Existing procedures for reading transaction recovery logs may be utilized in implementations of step 600.

At step 601, the transaction manager 75 finds an entry in the recovery log for an in-doubt transaction, wherein the proxy datasource is a participating resource in the in-doubt transaction. In contrast to the embodiment of FIGS. 6A and 6B, in exemplary static datasource configurations such as the one depicted in FIG. 2, the recovery log would list a concrete datasource as a participating resource.

At step 602, the transaction manager 75 requests an XA resource from the proxy datasource 76. In this configuration, the XA resource is a proxy XA resource, wherein the proxy datasource 76 provides the transaction manager 75 with the proxy XA resource.

At step 603, the transaction manager 75 queries the proxy XA resource for recoverable Xids.

At step 604, the proxy XA resource obtains a concrete XA resource from each available concrete datasource (e.g., the first datasource 77 and the second datasource 78).

At step 605, the proxy XA resource requests recoverable Xids from each of the concrete XA resources.

At step 606, the proxy XA resource builds a conglomerate list of recoverable Xids across all concrete XA resources and supplies this list to the transaction manager 75.

At step 607, the transaction manager 75 identifies the Xids for the in-doubt transaction from its entry in the recovery log.

At step 608, the transaction manager 75 matches up each Xid needing recovery with the XA resource that reported the Xid as recoverable.

At step 609, the transaction manager 75 requests, for each Xid needing recovery, the corresponding proxy XA resource to prepare that Xid for commit.

At 610, the corresponding proxy XA resources of step 609 each receive the respective request to prepare the Xid for commit, and use the Xid to identify a respective concrete XA resource.

At step 611, each of the corresponding proxy XA resources of step 610 delegate the prepare operation to the concrete XA resources identified at step 610.

At step 612, the transaction manager 75 requests, for each Xid needing recovery, the corresponding proxy XA resource to commit the transaction branch with the Xid.

At step 613, each of the corresponding proxy XA resources of step 612 receives a respective request to commit the transaction branch with the Xid and uses the Xid to identify the respective concrete XA resource.

At step 614, each of the corresponding XA resources of step 613 delegates the commit operation to the concrete XA resources identified at step 613.

At step 615, the server 60 successfully recovers the transaction. The above method steps are implemented for the commit path in XA resource recovery, however, the above-identified steps may be utilized for the rollback path instead, wherein the rollback operation is substituted for the commit operation.

Thus, embodiments of the invention enable the server 60 to perform eXtended Architecture (XA) recovery during a recovery phase, wherein the proxy datasource provides to a transaction manager of the computing device a single logical XA resource that supplies recoverable Xids for multiple XA resources, enabling the transaction manager to recover transactional operations across the first concrete datasource and a second concrete datasource, wherein the first and second concrete datasources are represented by the proxy datasource. In such embodiments, the concrete datasources are managed by the proxy datasource so that the transaction manager 75 only really knows about the proxy datasource 76 while the concrete datasources (e.g., first datasource 77 and second datasource 78) are largely hidden from the transaction manager 75. In embodiments, in addition to the concrete datasources that are managed by the proxy datasource (and essentially hidden from the transaction manager's view), other transactional resources may be recovered by the transaction manager 75. Thus, apart from the concrete datasources (e.g., first datasource 77 and second datasource 78) being managed by the proxy datasource 76, it is possible that other resources (not related to the proxy datasource or the concrete datasources) can be participants in transactions being recovered. Accordingly, embodiments of the invention enable the server 60 to recover transactional operations across: 1) the two or more concrete datasources which are represented (or managed) by the proxy datasource 76; and 2) any other transactional resources that happen to also be a participant in the transaction being recovered.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for implementing dynamic, configuration-based database connection in a server/application container environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

One exemplary computer-implemented method includes: receiving, by a proxy datasource, a request from an application for a connection to a specific datasource; reading, by the proxy datasource, configuration data associated with the requested connection; instantiating and configuring, by the proxy datasource, a concrete datasource implementation according to the configuration data; and returning, by the proxy datasource, the requested connection to the application. In implementations, the configuration data is updated dynamically to configure a new concrete datasource without restarting the application server/container environment. In aspects, the method further includes identifying, by the proxy datasource, a change to the configuration data; and marking cached concrete datasource instances affected by the change for disposal, such that new requests for datasources affected by the change result in instantiating a new instance of a concrete datasource.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by a computing device to cause the computing device to:
    obtain, by a software application of the computing device, a handle to a proxy datasource from an application container in response to a request for the handle to the proxy datasource, wherein the proxy datasource acts as a proxy to one or more concrete data sources and stores configuration data associated with one or more databases;
    send, by the software application of the computing device, a request for a connection to a first database to the proxy datasource of the computing device based on the handle, wherein the request includes a database identifier identifying the first database and configuration data associated with the first database;
    pass, by a first concrete datasource of the computing device, a connection to the first database to the proxy datasource;
    return, by the proxy datasource of the computing device, the connection to the software application, whereby the proxy datasource acts as an intermediary between the software application and the first concrete datasource to establish a connection between the software application and the first concrete datasource; and
    access, by the software application of the computing device, the first database via the connection.

2. The computer program product of claim 1, wherein the program instructions further cause the computing device to:
    determine that the first concrete datasource has not been created; and
    instantiate, by the proxy datasource of the computing device, the first concrete datasource for the first database according to the configuration data upon determining that the first concrete datasource has not been created.

3. The computer program product of claim 1, wherein the program instructions further cause the computing device to dynamically update stored configuration data of the proxy datasource to configure a new datasource without restarting the software application or the computing device.

4. The computer program product of claim 1, wherein the program instructions further cause the computing device to:
    identify, by the proxy datasource of the computing device, a change to the configuration data; and
    mark for disposal cached datasource instances affected by the change to the configuration data.

5. The computer program product of claim 4, wherein the program instructions further cause the computing device to:
    receive, by the proxy datasource of the computing device, a new request for a database connection to a second database, wherein the change to the configuration data affects the new request; and
    instantiate, by the proxy datasource of the computing device, a new concrete datasource by the proxy datasource in response to the new request.

6. The computer program product of claim 1, wherein the program instructions further cause the computing device to:
    request, by the software application of the computing device, the handle to the proxy datasource from the application container of the computing device; and
    provide, by the application container of the computing device, the handle to the software application.

7. The computer program product of claim 1, wherein the program instructions further cause the computing device to perform eXtended Architecture (XA) recovery during a recovery phase, wherein the proxy datasource provides to a transaction manager of the computing device a single logical XA resource that supplies recoverable Xids for multiple XA resources, enabling the transaction manager to recover transactional operations across the first concrete datasource and a second concrete datasource, wherein the first and second concrete datasources are represented by the proxy datasource.

8. The computer program product of claim 1, wherein the proxy datasource acts as a proxy to multiple concrete datasources and stores configuration data associated with multiple databases.

9. The computer program product of claim 1, wherein the program instructions further cause the computing device to:
store, by the proxy datasource of the computing device, the configuration data associated with the first database as stored configuration data;
instantiate, by the proxy datasource of the computing device, a new concrete datasource by the proxy datasource in response to the new request; and
update dynamically, by the proxy datasource of the computing device, the stored configuration data based on the new concrete datasource.

10. The computer program product of claim 1, wherein the program instructions further cause the computing device to:
identify, by the proxy datasource of the computing device, a change to the configuration data associated with the first database;
mark for disposal cached datasource instances affected by the change to the configuration data associated with the first database; and
provide, by the proxy datasource, a single logical eXtended Architecture (XA) resource the supplies recoverable Xids for multiple XA resources to a transaction manager of the application container, whereby the transaction manager is enabled to agnostically recover transactional operations across multiple concrete datasources.

11. The computer program product of claim 1, wherein the handle is a reference based on the configuration data.

12. A system comprising:
a processor, a computer readable memory and a computer readable storage medium associated with a computing device;
program instructions to obtain, by a software application of the computing device, a handle to a proxy datasource from an application container in response to a request for the handle to the proxy datasource, wherein the proxy datasource acts as a proxy to multiple concrete data sources and stores configuration data associated with multiple databases;
program instructions to send, by the software application of the computing device, a request to the proxy datasource of the computing device for a connection to a first database based on the handle, wherein the request includes a database identifier and configuration data associated with the first database;
program instructions to instantiate, by the proxy datasource of the computing device, a first concrete datasource for the first database according to the configuration data associated with the first database;
program instructions to pass, by the proxy datasource of the computing device, a connection to the first database to the proxy datasource;
program instructions to return, by the proxy datasource of the computing device, the connection to the software application, whereby the proxy datasource acts as an intermediary between the software application and the first concrete datasource to establish a connection between the software application and the first concrete datasource; and
program instructions to access, by the software application of the computing device, the database via the connection,
wherein the program instructions are stored on the computer readable storage medium for execution by the processor via the computer readable memory.

13. The system of claim 12, further comprising program instructions to dynamically update stored configuration data of the proxy datasource to configure a new concrete datasource to connect the software application to a second database without restarting the software application or the computing device.

14. The system of claim 12, further comprising:
program instructions to identify, by the proxy datasource of the computing device, a change to the configuration data; and
program instructions to mark for disposal cached datasource instances affected by the change to the configuration data.

15. The system of claim 14, further comprising:
program instructions to receive, by the proxy datasource of the computing device, a new request for a database connection to a second database, wherein the change to the configuration data affects the new request; and
program instructions to instantiate, by the proxy datasource, a new concrete datasource by the proxy datasource in response to the new request.

16. The system of claim 12, further comprising:
program instructions to request, by the software application of the computing device, the handle to the proxy datasource from the application container of the computing device; and
program instructions to provide, by the application container of the computing device, the handle to the software application.

17. The system of claim 12, further comprising program instructions to perform eXtended Architecture (XA) recovery during a recovery phase, wherein the proxy datasource provides to a transaction manager of the computing device a single logical XA resource that supplies recoverable Xids for multiple XA resources, enabling the transaction manager to recover transactional operations across the first concrete datasource and a second concrete datasource, wherein the first and second concrete datasources are represented by the proxy datasource.

18. The system of claim 12, further comprising:
program instructions to store, by the proxy datasource of the computing device, the configuration data associated with the first database as stored configuration data;
program instructions to instantiate, by the proxy datasource of the computing device, a new concrete datasource by the proxy datasource in response to the new request; and
program instructions to update dynamically, by the proxy datasource of the computing device, the stored configuration data based on the new concrete datasource.

19. The system of claim 12, further comprising:
program instructions to identify, by the proxy datasource of the computing device, a change to the configuration data associated with the first database;
program instructions to mark for disposal cached datasource instances affected by the change to the configuration data associated with the first database; and program instructions to provide, by the proxy datasource, a single logical eXtended Architecture (XA) resource that supplies recoverable Xids for multiple XA resources to a transaction manager of the application container, whereby the transaction manager is enabled to agnostically recover transactional operations across the multiple concrete datasources.

20. The system of claim 12, wherein the handle is a reference based on the configuration data.

\* \* \* \* \*